(12) United States Patent
Alvarez Guevara et al.

(10) Patent No.: US 9,412,376 B2
(45) Date of Patent: Aug. 9, 2016

(54) SPEAKER VERIFICATION USING CO-LOCATION INFORMATION

(71) Applicant: Google Inc., Mountain View, CA (US)

(72) Inventors: Raziel Alvarez Guevara, Menlo Park, CA (US); Othar Hansson, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/805,687

(22) Filed: Jul. 22, 2015

(65) Prior Publication Data

US 2016/0019889 A1  Jan. 21, 2016

Related U.S. Application Data

(63) Continuation of application No. 14/335,380, filed on Jul. 18, 2014, now Pat. No. 9,257,120.

(51) Int. Cl.
*G10L 15/04* (2013.01)
*G10L 17/00* (2013.01)
*G10L 15/08* (2006.01)
(Continued)

(52) U.S. Cl.
CPC ............. *G10L 17/00* (2013.01); *G06F 21/32* (2013.01); *G10L 15/08* (2013.01); *G10L 17/22* (2013.01); *G10L 19/00* (2013.01); *G06F 2221/2111* (2013.01)

(58) Field of Classification Search
CPC ......... G10L 15/30; G10L 15/20; G10L 15/00; G10L 15/32; G10L 15/08; G10L 15/24; G10L 2015/227; G10L 2025/783; G10L 25/51

USPC ......... 704/231, 235, 230, 251, 255, 257, 270, 704/270.1, 272, 254
See application file for complete search history.

(56) References Cited

U.S. PATENT DOCUMENTS

| 5,895,448 | A | 4/1999 | Vysotsky et al. |
| 8,209,184 | B1 | 6/2012 | Dragosh et al. |

(Continued)

FOREIGN PATENT DOCUMENTS

EP  1511277  3/2005

OTHER PUBLICATIONS

"Speaker Recognition", Wikipedia, the free encyclopedia, 5 pages, last modified on Jan. 30, 2014; downloaded from the internet on May 15, 2014, http://en.wikipedia.org/wiki/Speaker_recognition.

(Continued)

*Primary Examiner* — Huyen Vo
(74) *Attorney, Agent, or Firm* — Fish & Richardson P.C.

(57) ABSTRACT

Methods, systems, and apparatus, including computer programs encoded on computer storage media, for identifying a user in a multi-user environment. One of the methods includes receiving, by a first user device, an audio signal encoding an utterance, obtaining, by the first user device, a first speaker model for a first user of the first user device, obtaining, by the first user device for a second user of a second user device that is co-located with the first user device, a second speaker model for the second user or a second score that indicates a respective likelihood that the utterance was spoken by the second user, and determining, by the first user device, that the utterance was spoken by the first user using (i) the first speaker model and the second speaker model or (ii) the first speaker model and the second score.

20 Claims, 4 Drawing Sheets

(51) Int. Cl.
*G10L 17/22* (2013.01)
*G10L 19/00* (2013.01)
*G06F 21/32* (2013.01)

(56) References Cited

U.S. PATENT DOCUMENTS

| | | | |
|---|---|---|---|
| 8,543,402 | B1 | 9/2013 | Ma |
| 8,595,007 | B2 | 11/2013 | Kane |
| 8,645,137 | B2 | 2/2014 | Bellegarda et al. |
| 2003/0236099 | A1 | 12/2003 | Deisher et al. |
| 2004/0158457 | A1 | 8/2004 | Veprek et al. |
| 2004/0230420 | A1 | 11/2004 | Kadambe et al. |
| 2005/0135583 | A1 | 6/2005 | Kardos et al. |
| 2007/0198849 | A1 | 8/2007 | Mozer |
| 2011/0282661 | A1* | 11/2011 | Dobry ............... G10L 17/02 704/231 |
| 2013/0006634 | A1 | 1/2013 | Grokop et al. |
| 2013/0024196 | A1 | 1/2013 | Ganong et al. |
| 2013/0262873 | A1 | 10/2013 | Read et al. |
| 2013/0325484 | A1* | 12/2013 | Chakladar ............ G06F 3/167 704/275 |
| 2014/0074471 | A1* | 3/2014 | Sankar ............... G10L 17/02 704/246 |
| 2014/0337032 | A1 | 11/2014 | Aleksic et al. |

OTHER PUBLICATIONS

"Voice Biometrics Evaluation Studio™ 8.2 :: Product Description", Customer Care Solutions from Nuance, 2012, 6 pages.
Germain, François G. et al., "Speaker and Noise Independent Voice Activity Detection", Mar. 26, 2013, 9 pages.
Hurmalainen, Antti et al., "Detection, Separation and Recognition of Speech from Continuous Signals Using Spectral Factorisation", 20th European Signal Processing Conference (EUSIPCO 2012), Bucharest, Romania, Aug. 27-31, 2012, 5 pages.
Kim, Youngmoo E. et al., "Comparison of a Joint Iterative Method for Multiple Speaker Identification with Sequential Blind Source Separation and Speaker Identification", Proceedings of the 2008 IEEE Odyssey Workshop on Speaker and Language Recognition, Stellenbosch, South Africa, 8 pages.
Kotti, Margarita et al., "Speaker Segmentation and Clustering", Preprint submitted to Elsevier Preprint Oct. 31, 2007, 54 pages.
Kwon, Soonil et al., "Unsupervised Speaker Indexing Using Generic Models", IEEE Transaction on Speech and Audio Processing, vol. 13, No. 5, Sep. 2005, 10 pages.
Maes, Stéphanie H. et al., "Conversational Speech Biometrics," J. Liu and Y. Ye (Eds.): E-Commerce Agents, LNAI 2033, Springer-Verlag, Berlin Heidelberg 2001, 14 pages.
Navrátil, U.V. et al., "A Speech Biometrics System with Multi-Grained Speaker Modeling", 2000, 5 pages.
Ramfrez, Javier et al., "Statistical Voice Activity Detection Using a Multiple Observation Likelihood Ratio Test", IEEE Signal Processing Letters, vol. 12, No. 10, Oct. 2005, 4 pages.
Schabus, Dietmar et al., "Objective and Subjective Feature Evaluation for Speaker-Adaptive visual Speech Synthesis", International Conference on Auditory-Visual Processing, 2013, 6 pages.
Walsh, John MacLaren et al., Joint Iterative Multi-Speaker Identification and Source Separation Using Expectation Propagation:, Proceedings of the 2007 IEEE Workshop on Applications of Signal Processing to Audio and Acoustics, New Paltz, NY, 4 pages.
Office Action issued in U.S. Appl. No. 14/335,380 on Sep. 9, 2014, 18 pages.
Office Action issued in U.S. Appl. No. 14/335,380 on Jan. 26, 2015.
Notice of Allowance issued in U.S. Appl. No. 14/335,380 on May 27, 2015, 10 pages.
International Search Report and Written Opinion in International Application No. PCT/US2015/030569, mailed Jul. 27, 2015, 11 pages.
Office Action issued in U.S. Appl. No. 14/335,380 on Sep. 4, 2015, 16 pages.
Notice of Allowance issued in U.S. Appl. No. 14/335,380 on Nov. 13, 2015, 13 pages.

\* cited by examiner

SPEAKER VERIFICATION USING CO-LOCATION INFORMATION

CROSS-REFERENCE TO RELATED APPLICATION

This application is a continuation of U.S. application Ser. No. 14/335,380, filed Jul. 18, 2014, the contents of which are incorporated by reference.

TECHNICAL FIELD

This specification relates to speaker verification.

BACKGROUND

In a speech-enabled environment, such as a home or automobile, a user may access information or control various functions using voice input. The information and functions may be personalized for a given user. In multiple user environments, it may be advantageous to identify a given speaker from among a group of speakers.

SUMMARY

This specification relates to enhancing speaker verification systems by providing speaker verification systems with more information. For example, certain speaker verification systems involve continuously listening for a predefined phrase in order to wake up a computing device, usually to perform further processing and/or receive more user input, such as speech commands and queries. Such speaker verification systems may differentiate an utterance of the predefined phrase from among a set of enrolled users in the device and unknown, non-enrolled users. In typical scenarios, a particular computing device will detect any utterances of the predefined phrase that are spoken by people located in relatively close proximity to the device, e.g., a group of people in a meeting room, or other diners at a table. In some instances, these people may use compatible speaker verification systems with their devices. By taking advantage of co-location information, the speaker verification system associated with each device can detect whether an utterance was spoken by an enrolled user of the respective device or by another user in close proximity, e.g., an imposter, and this information can be used to improve the speaker verification decision.

In general, one innovative aspect of the subject matter described in this specification can be embodied in methods that include the actions of receiving, by a first user device, an audio signal encoding an utterance, obtaining, by the first user device, a first speaker model for a first user of the first user device, obtaining, by the first user device for a second user of a corresponding second user device that is co-located with the first user device, a second speaker model for the second user or a second score that indicates a respective likelihood that the utterance was spoken by the second user, and determining, by the first user device, that the utterance was spoken by the first user using (i) the first speaker model and the second speaker model or (ii) the first speaker model and the second score. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In general, one innovative aspect of the subject matter described in this specification can be embodied in methods that include the actions of receiving, by a first user device, an audio signal encoding an utterance, obtaining, by the first user device, a first speaker model for a first user of the first user device, obtaining, by the first user device for each of a plurality of other users of other user devices that are co-located with the first user device, a speaker model for each respective users or a score that indicates a respective likelihood that the utterance was spoken by the respective user, and determining, by the first user device, that the utterance was spoken by the first user using (i) the first speaker model and the plurality of other speaker models or (ii) the first speaker model and the plurality of scores. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In general, one innovative aspect of the subject matter described in this specification can be embodied in methods that include the actions of receiving, by a first user device, an audio signal encoding an utterance, determining, by the first user device, a first speaker model for a first user of the first user device, determining, by the first user device, one or more second speaker models, stored on the first user device, for other people who may be co-located with the first user device, and determining, by the first user device, that the utterance was spoken by the first user using the first speaker model and the second speaker models. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In general, one innovative aspect of the subject matter described in this specification can be embodied in methods that include the actions of receiving, by at least one of the computers, an audio signal encoding an utterance, obtaining, by at least one of the computers for each of two or more user devices, an identification of a respective speaker models for a respective user of the respective user device, determining, by at least one of the computers, that the utterance was spoken by a particular user of one of the user devices using the identified speaker models. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In general, one innovative aspect of the subject matter described in this specification can be embodied in methods that include the actions of receiving, by a first user device, an audio signal encoding an utterance, obtaining, by the first user device, a first score that indicates a likelihood that the utterance was spoken by a first user of the first user device, obtaining, by the first user device for a second user of a corresponding second user device that is co-located with the first user device, a second score that indicates a respective likelihood that the utterance was spoken by the second user, determining, by the first user device, a combination of the first score and the second score, normalizing, by the first user device, the first score and the second score using the combination of the first score and the second score, and determining, by the first user device, that the utterance was spoken by the first user using the normalized first score and the normalized second score.

The foregoing and other embodiments can each optionally include one or more of the following features, alone or in combination. Obtaining, by the first user device for the second user of the corresponding second user device that is co-located with the first user device, the second speaker model for the second user or the second score that indicates a respective likelihood that the utterance was spoken by the second user may include obtaining, by the first user device for the second user of the second user device that is co-located in a physical area near a physical location of the first user device, the second speaker model for the second user or the second score that indicates a respective likelihood that the utterance was spoken by the second user. The method may include performing an action in response to determining that the utterance was spoken by the first user. The method may include analyzing the audio signal to identify a command included in the utterance, and performing an action that corresponds with the command. The method may include generating, by the first user device, a first score that indicates a likelihood that the utterance was spoken by the first user using a portion of the audio signal and the first speaker model. The method may include comparing the first score with the second score to determine a highest score. Determining that the utterance was spoken by the first user may include determining that the first score is the highest score.

In some implementations, obtaining, by the first user device for the second user of the corresponding second user devices that is located in a physical area near a physical location of the first user device, a second speaker model for the second user or a second score that indicates a respective likelihood that the utterance was spoken by the second user may include obtaining, by the first user device, the second speaker model, and generating, by the first user device, the second score using a portion of the audio signal and the second speaker model.

In some implementations, obtaining, by the first user device for the second user of the corresponding second user device that is located in a physical area near a physical location of the first user device, a second speaker model for the second user or a second score that indicates a respective likelihood that the utterance was spoken by the second user may include determining, by the first user device, that the second user device is located in the physical area near the physical location of the first user device, determining, by the first user device, that the first user device has settings that allow the first user device access to the second speaker model, receiving, by the first user device, the second speaker model, and generating, by the first user device, the second score using a portion of the audio signal and the second speaker model. Receiving, by the first user device, the second speaker model may include identifying, by the first user device, one or more third speaker models stored on the first user device, and determining, by the first user device, that a subset of the third speaker models may include the second speaker model. The method may include removing, by the first user device, the third speaker models not included in the subset of the third speaker models from the first user device. Receiving, by the first user device, the second speaker model may include retrieving, by the first user device, the second speaker model from a memory in the first user device. Generating, by the first user device, the second score may include generating, by the first user device, the second score using the second speaker model stored on the first user device and a portion of the audio signal without requesting the second speaker model from another user device. Receiving, by the first user device, the second speaker model may include receiving, by the first user device, the second speaker model from a server. The second user device may include the second speaker model. Receiving, by the first user device, the second speaker model may include receiving, by the first user device, the second speaker model from the second user device.

In some implementations, obtaining, by the first user device the second user of the corresponding second user device that is located in a physical area near a physical location of the first user device, a second speaker model for the second user or a second score that indicates a respective likelihood that the utterance was spoken by the second user may include determining, by the first user device, that the second user device is located in the physical area near the physical location of the first user device, and receiving, by the first user device, the second score. Receiving, by the first user device, the second score may include receiving, by the first user device, the second score from the second user device. Receiving, by the first user device, the second score may include receiving, by the first user device, the second score from a server. The method may include determining, by the first user device, a device identifier for the second user device, and providing, by the first user device, the device identifier to the server, wherein the first user device receives the second score from the server in response to providing the identifier to the server.

In some implementations, the method may include determining, by the first user device, one or more third speaker models, stored on the first user device, for other people who may be located in a physical area near a physical location of the first user device, and determining, by the first user device, that the utterance was spoken by the first user using (i) the first speaker model, the second speaker model, and the third speaker models or (ii) the first speaker model, the second score, and the third speaker models. The method may include generating, by the first user device, a first score that indicates a likelihood that the utterance was spoken by the first user using a portion of the audio signal and the first speaker model, generating, by the first user device for each of the third speaker models, a respective third score using the respective third speaker model and a portion of the audio signal, and comparing, by the first user device, the first score, the second score, and the third scores to determine a highest score. The method may include determining, by the first user device for a third user device, a frequency with which the third user device is located in a physical area near a physical location of the first user device, determining, by the first user device, whether the frequency satisfies a threshold frequency, and storing, by the first user device, a third speaker model for a third user of the third user device in the third speaker models in response to determining that the frequency satisfies the threshold frequency. The method may include receiving, by the first user device, input from the first user identifying a third speaker model, and storing, by the first user device, the third speaker model in the third speaker models in response to receiving the input from the user identifying the third speaker model.

In some implementations, the method may include receiving, by at least one of the computers for each of the user devices, the respective speaker model from the respective user device. The method may include retrieving, by at least one of the computers for each of the user devices, the respective speaker model from a memory included in at least one of the computers using the respective identification.

In some implementations, the method may include determining, by the first user device, that the normalized first score satisfies a threshold value, wherein determining that the utterance was spoken by the first user is in response to determining that the normalized first score satisfies the threshold value. The method may include determining, by the first user device, that an average of the first score and the second score does not satisfy the threshold value, wherein determining the combination of the first score and the second score is in response to determining that the average of the first score and the second score does not satisfy the threshold value. The method may include determining, by the first user device, that both the first score and the second score do not satisfy the threshold value, wherein determining the combination of the first score and the second score is in response to determining that both the first score and the second score do not satisfy the threshold value. The method may include determining, by the first user device, that the first score does not satisfy the threshold value, wherein determining the combination of the first score and the second score is in response to determining that the first score does not satisfy the threshold value.

The subject matter described in this specification can be implemented in particular embodiments so as to realize one or more of the following advantages. In some implementations, the use of imposter speaker models may reduce actions by a user device in response to utterances spoken by a person other than a user of the user device. In some implementations, a system may reduce false positives by sixty to eighty percent when using imposter speaker models. In some implementations, a system may normalize a final utterance score using a combination of the scores for different co-located speakers.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
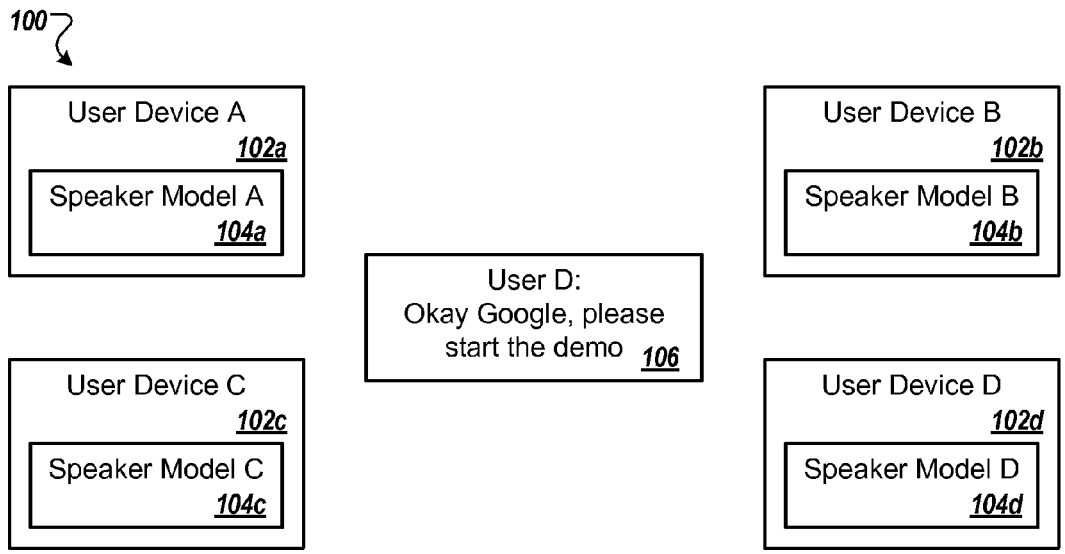
FIGS. 1A-C show an example of an environment in which one or more user devices A-D analyze an audio signal encoding an utterance.

Speaker verification systems may include a process of continuously listening for a predefined phrase in order to wake up a computing device, usually to perform further processing and/or receive more user input, such as speech commands and queries. Such speaker verification systems may differentiate an utterance of the hotword from a set of enrolled users in the device and from unknown, non-enrolled users.

Enrollment refers to whether a user has provided sample utterances to the system to create a model that can be used to discriminate him or her from other users, known or unknown. The speaker verification process may involve comparing a model created for a given utterance against the model created for the speaker (or speakers), and deciding whether to accept or reject the utterance based on a similarity threshold.

Speaker verification systems have applicability in a wide range of areas, and also a wide range of performance requirements—particularly with regards to recognition quality, and impostor prevention effectiveness. For example, a speaker verification system used to unlock a device may have higher requirements to provide low false acceptance of impostors, than when the system is used in an already unlocked device in a trusted environment, where false acceptance can be relaxed in favor of lower false rejections (not recognizing an enrolled user).

When the verification system only has the information provided from the enrolled speaker(s) to perform the decision of acceptance or denial of the given utterance, the verification process may be challenging since the set of unknown possible impostors is practically unbound. This may result in a higher probability that an utterance from an unknown speaker will exceed the similarity threshold for an enrolled speaker, resulting in a false acceptance. This challenge is of particular importance with mobile devices, where the availability of possible impostors around the device increases and changes constantly.

Speaker verification systems may be improved by providing more information to these systems. In particular, by utilizing co-location information provided by generally available APIs, which may already present in mobile devices/platforms, the verification system on each device can detect whether there are possible impostors nearby. Such information can be used to adjust the similarity threshold, and also share their enrolled speaker models to improve the verification decision. In some examples, systems may normalize a score for one or more speakers models using a combination of the scores for co-located speakers. For instance, a user device may use speaker models stored on the user device and speaker models received from other user devices to generate respective scores, determine a combination of the scores, and normalize each of the scores using the combination.

For example, user devices may generate lower scores for utterances because of background noise, e.g., the scores may decrease in proportion to the background noise. In highly noisy conditions, such as a running vehicle or a crowded restaurant, it may be possible that a score for an utterance from a user of the user device does not satisfy a threshold value, e.g., is lower than or equal to an acceptance threshold, and be falsely rejected. The normalization of the scores may reduce the noise penalty. For instance, since the average of multiple scores each generated using a different speaker model does not satisfy the acceptance threshold, e.g., is lower than or equal to the acceptance threshold, normalization would result in improving each of the scores such that the score for the user of the user device should satisfy the acceptance threshold, e.g., be greater than the acceptance threshold.

Because such verification systems may access models of possible impostors, these systems may be able to better reject some utterances (e.g., reduce a false acceptance rate) in those cases where an utterance of an impostor obtains a similarity score against an enrolled user that is higher than the acceptance threshold. For example, if an utterance has an equal or higher score against one of the models in the "impostors" set, e.g., created from the co-located users, then the system can assume the utterance is likely from an impostor and reject it. Such an approach may be compatible with various types of speaker models, e.g., i-vectors, d-vectors, etc.

There may be multiple ways to determine when devices are co-located in a given geographical area. For example, this information may be derived from one or more of global positioning system (GPS), near field communication (NFC), Bluetooth, Subsonic audio, and/or other sensors and technologies. In some examples, co-located devices may be associated virtually, e.g., when the devices participate in the same telephone or video conference. In these examples, the devices, or a server, may determine co-location using calendar entries, email or text messages, or other "soft" concepts.

Multiple users may also be co-located in the same area when not all of the users have a corresponding user device, but some of the user devices include speaker models for those users. For instance, when five friends are in one of their living rooms, and two of the friends have their mobile devices, a first mobile device may include speaker models for the three friends that do not have mobile devices with them and the first and second mobile devices can use those speaker models, and the speaker models for the friends that own the devices, to determine which of the friends spoke a particular utterance.

In exemplary implementations, a speaker verification system receives an audio signal encoding an utterance and determines whether a score generated using a speaker model satisfies a threshold score value. When the speaker verification system uses only a single speaker model for a particular user of a particular user device, the speaker verification system may generate a score that satisfies the threshold score value for an utterance spoken by another user (e.g., the user's brother).

The speaker verification system uses multiple speaker models, for example one for the user and another for the user's brother, to increase the accuracy of the speaker verification system. For instance, the speaker verification system generates two scores for an audio signal encoding the utterance, one for the user and another score for his brother. The speaker verification system compares the scores, both of which may satisfy the threshold score value, to determine which score is highest. The speaker verification system is most likely to generate a highest score using a speaker model for the particular person that spoke the utterance compared to when a different person speaks the utterance, e.g., as the speaker model for that different person will be used to generate the highest score.

When the speaker verification system determines that the score for the user is highest, e.g., generated using a speaker model for the user, the particular user device may perform an action in response to the utterance. When the speaker verification system determines that the score for the user's brother is highest, e.g., generated using the speaker model for the user's brother, the particular user device takes no action.

The speaker verification system may use other speaker models for other users in a physical area near the particular user device, e.g., co-located with the particular user device, or scores received from those other user devices to determine which score is the greatest and whether the particular user device should perform an action in response to the utterance. The speaker verification system may execute on the particular device or another device, e.g., a server.

Figure 1B:
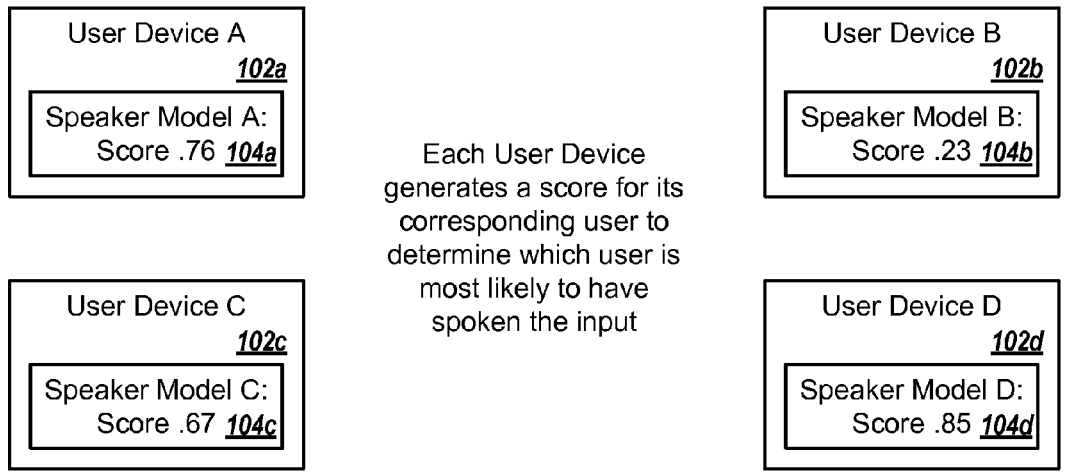
Figure 1C:
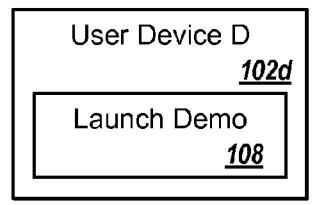

FIGS. 1A-C show an example of an environment 100 in which one or more user devices A-D 102*a-d* analyze an audio signal encoding an utterance. The user devices A-D 102*a-d* may use one of multiple different algorithms to determine whether the utterance was likely spoken by a respective user of the user device, and the user device should perform an action in response to the utterance, or that the utterance was not likely spoken by the respective user and the user device should take no action.

For example, four co-workers may be in a conference room and a first co-worker, e.g., user D, may issue the command "Okay Google, please start the demo." The user device A 102*a* may analyze the audio signal using multiple speaker models, including a speaker model A 104*a* for a user A of the user device A 102*a* and other speaker models for other users, e.g., that are sometimes or often in the same physical area as the user A or the user device A 102*a*. The other speaker models may be stored in a memory of the user device A 102*a* for a short period of time, e.g., when the user device A 102*a* recently requested a particular speaker model from another user device B-D 102*b-d*, or for a long period of time, e.g., when there is a high probability that the other users are in the same physical area as the user device A 102*a*.

The user device A 102*a* determines a score for each of the speaker models and a highest score from the multiple scores. The user device A 102*a* may determine whether the highest score satisfies the threshold score value, e.g., by comparing the highest score with a threshold score value, and that there is a high likelihood that the highest score is for the user A of the user device A 102*a*. If the highest score does not satisfy the threshold score value, the user device A 102*a* may take no further action, e.g., and determine that the utterance was spoken by a user for which the user device A 102*a* does not have a speaker model.

When the user device A 102*a* determines that the highest score is for the user A of the user device A 102*a*, e.g., that the first co-worker who issued the command is the user A, the user device A 102*a* performs an action in response to the receipt of the audio signal. For instance, the user device A 102*a* may launch the requested demo.

When the user device A 102*a* determines that the highest score was not for the user A and that the first co-worker is not the user A, the user device A 102*a* may take no further action with respect to the audio signal. For example, the user device A 102*a* may receive another audio signal with another utterance spoken by the first co-worker and take no action in response to the other utterance.

In some examples, when the user devices A-D 102*a-d* include the same or a compatible speaker verification system, each of the user devices A-D 102*a-d* may share information about its respective users, e.g., speaker models, or about analysis of an audio signal encoding an utterance, e.g., scores. For instance, as shown in FIG. 1A, a first co-worker, e.g., the user D, may say an utterance 106 "Okay Google, please start the demo" and a microphone on each of the user devices A-D 102*a-d* may capture a signal representing the utterance and encode the utterance in an audio signal.

Each of the user devices A-D 102*a-d* analyzes the respective audio signals using the corresponding speaker models A-D 104*a-d* to generate a score that represents the likelihood that the respective user A-D of the user device spoke the utterance 106, as shown in FIG. 1B. In this example, the user device A 102*a* generates a score of 0.76 for the user A, the user device B 102*b* generates a score of 0.23 for the user B, the user device C 102*c* generates a score of 0.67 for the user C, and the user device D 102*d* generates a score of 0.85 for the user D.

Each of the user devices A-D 102*a-d* shares the respective scores with the other user devices. For instance, the user devices A-D 102*a-d* may use one or more sensors, such as a GPS, NFC, Bluetooth, subsonic audio, or any other appropriate technology, to determine other user devices that are physically located in an area near the respective user device. The user devices A-D 102*a-d* may determine access settings that indicate whether the user device can share its score with another user device, and may determine whether the other user devices use the same speaker verification system, e.g., and can use the score, or both.

Each of the user devices A-D 102*a-d* compares all of the scores with each other to determine whether the score generated by the respective user device is the highest score and the respective user device should perform an action in response to the utterance 106. For example, as shown in FIG. 1C, the user device D 102*d* determines that the score generated using the speaker model D 104*d* for the user D of the user device D 102*d* is the highest, and that the likelihood that the utterance 106 was spoken by the user D is greater than likelihoods that the utterance 106 was spoken by the other users for the other user devices A-C 102*a-c*. The user device D 102*d* may perform an action that corresponds with the utterance 106, such as launching the requested demo 108. The user device D 102*d* may compare the highest score with a threshold score value to ensure that there is a high likelihood that the utterance was spoken by the user D and not another user, e.g., for which the user device D 102*d* did not receive a score.

Similarly, each of the other user devices A-C 102*a-c* determines that its respective score is not the greatest and that the respective other user device should take no action. Prior to determining that its respective score is not the greatest score, each of the other user devices A-C 102*a-c* may compare the highest score with a threshold score value, e.g., specific to the respective user device, to ensure that there is at least a minimum similarity between the utterance and one of the speaker models and that the utterance was not spoken by another user for which the other user devices A-C 102*a-c* do not have a respective speaker model. The other user devices A-C 102*a-c* may or may not know information about the user, the user device, or both that corresponds with the highest score when the highest score is received from another user device. For instance, each of the user devices A-D 102*a-d* may send the scores to the other user devices without any identification information, e.g., of the user or the user device. In some examples, a user device may send a score with an identifier for the user for which the score was generated.

Figure 2:
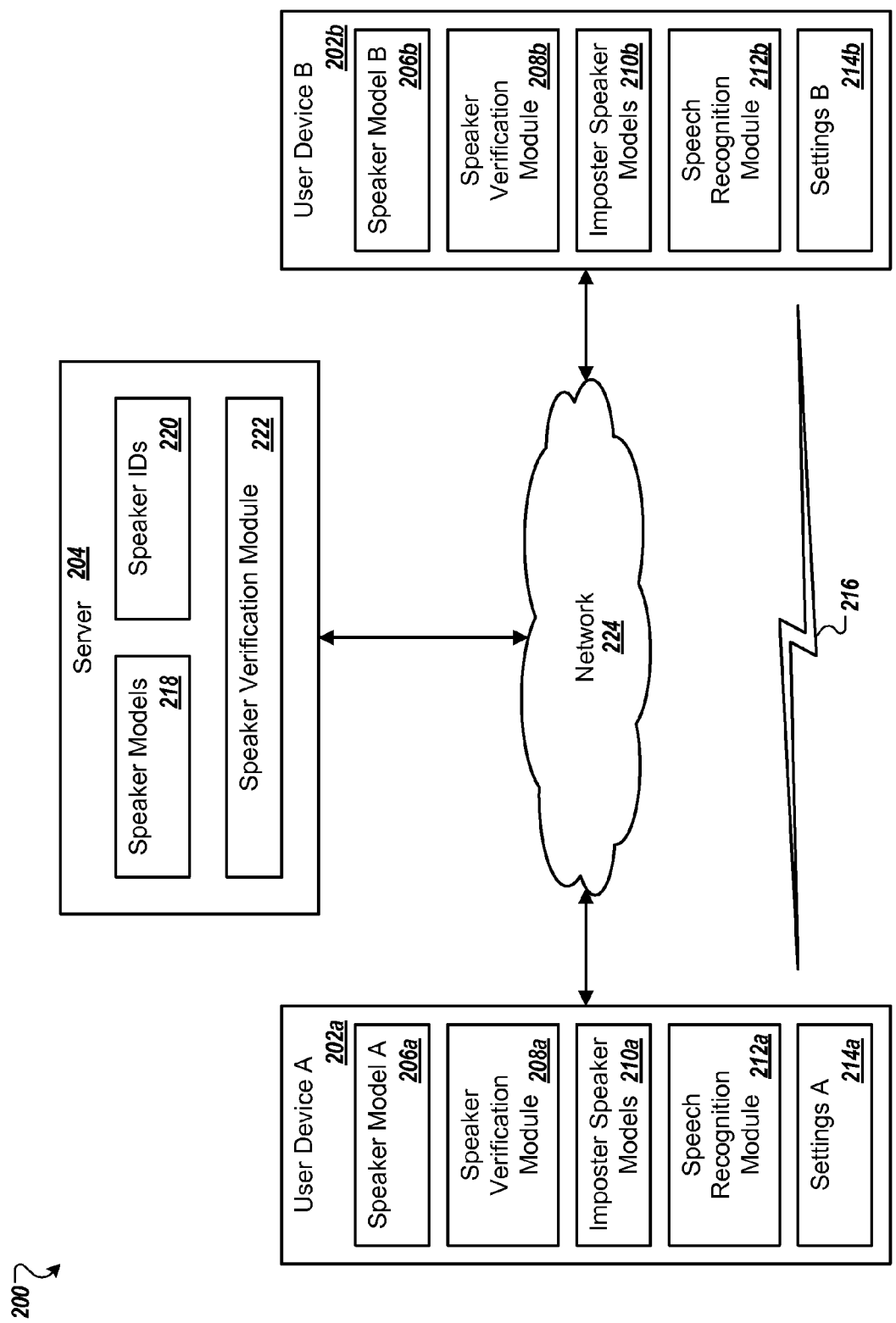
FIG. 2 is an example of a speaker verification system.

FIG. 2 is an example of a speaker verification system 200. One or more user devices A-B 202*a-b* or a server 204 may analyze an audio signal encoding an utterance, e.g., data representing properties of the utterance, to determine a user that most likely spoke the utterance. The user devices A-B 202*a-b*, the server 204, or a combination of two or more of these devices may analyze the audio signal using a speaker model, compare the different analysis of the audio signal determined using the speaker models, and determine whether a particular user spoke the utterance.

For example, each of the user devices A-B 202*a-b* includes a speaker model A-B 206*a-b* for its respective user. The speaker models A-B 206*a-b* may be generated for the particular users using any appropriate method, such as having each user speak a registration phrase and then, for example, extracting mel-frequency cepstral coefficient (MFCC) features from the keyword sample and using these features as a reference for future comparison, and/or training a neural network using representations of utterances spoken by the particular user.

A speaker verification module A 208*a* uses the speaker model A 206*a* for the user A of the user device A 202*a* to determine a likelihood that a particular utterance was spoken by the user A. For instance, the speaker verification module A 208*a* receives an audio signal encoding the particular utterance, e.g., a representation of the audio signal, and uses the speaker model A 206*a* to generate a score that represents the likelihood that the particular utterance was spoken by the user A.

The speaker verification module A 208*a* may use one or more imposter speaker models 210*a*, stored on the user device A 202*a*, to generate a score that represents a likelihood, for each of the imposter speaker models 210*a*, that the particular utterance was spoken by a respective user that corresponds with a particular imposter speaker model. For example, the user device A 202*a* may receive the audio signal, determine that the user device B 202*b* is located in a physical area near a physical location of the user device A 202*a*, e.g., in the same room, and request speaker models for the users of the user device B 202*b* from the user device B 202*b*, e.g., the speaker model B 206*b*, or from the server 204. For instance, the user device A may send a device identifier for the user device B 202*b*, or an identifier for the user B, as part of a request for the speaker model B 206*b*, e.g., to the server 204. The user device A 202*a* stores the speaker model B 206*b* as one of the imposter speaker models 210*a* in a memory and the speaker verification module 208*a* generates a score for each of the imposter speaker models 210*a*.

The imposter speaker models 210*a* may include speaker models for other users that may be in a physical area near the physical location of the user device A 202*a*, such as the same room, hallway, or part of a sidewalk or path, etc. The imposter speaker models may include speaker models for users who are frequently in the same physical area as the user A or the user device A 202*a*, e.g., as determined using historical data. For example, the user device A 202*a* may determine that another user device, e.g., a user device C, is in the same physical area as the user device A 202*a* about four hours each work day, that this daily four hour duration is greater than a daily three hour threshold duration, e.g., specific to work days, an average daily duration, etc., and that a speaker model C for a user C of the user device C should be stored in the imposter speaker models 210*a*, e.g., until the user A requests the removal of the speaker model C from the imposter speaker models 210*a* or the daily duration for the user device C no longer satisfies the threshold duration. The frequency may be a specific value, e.g., four hours a day, or a percentage, e.g., five percent of the time the user device A 202 detects a particular other user device or ten percent of a total quantity of other user devices detected by the user device A 202*a* are a particular other user device, to name a few examples.

In some examples, the user A may identify one or more speaker models that the user device A 202*a* should include in the imposter speaker models 210*a*. For example, the user device A 202*a* may receive input training another speaker model on the user device A 202*a* for a family member or friend of the user A. The input may indicate that the other speaker model should be an imposter speaker model, e.g., and is a speaker model for a user other than the user A who is not a user of the user device A 202*a*. The other speaker model may be for another user that is often in a physical area surrounding the user device A 202a, e.g., a child of the user A, to reduce or eliminate actions performed by the user device A 202a in response to an utterance spoken by the other user, unless the user device A 202a is programmed otherwise.

For instance, when the speaker verification module 208a generates a first score using the speaker model A 206a and a respective second score for each of the imposter speaker models 210a, the speaker verification module 208a compares the scores to determine a highest score. When the highest score is generated using the speaker model A 206a, the speaker verification module 208a determines that the user A spoke the particular utterance and that the user device A 202a may take an appropriate action, e.g., a speech recognition module 212a may analyze the particular utterance to identify a command included in the particular utterance.

In one example, one of the imposter speaker models may be for the user A's sibling, e.g., when both of the siblings have similar voices. The speaker verification module 208a generates the first score for the user A and a second score for his brother, by analyzing an utterance spoken by one of the brothers using the respective speaker models. The speaker verification module 208a compares the two scores, each of which may be greater than a threshold score and alone would otherwise trigger an action by the user device A 202a, e.g., because of similarities in the speaker models, to determine which score is greater. When the first score for the user A is greater than the second score, the user device A 202a performs an action based on the utterance, e.g., and the action may be determined in part using the speech recognition module 212a. When the second score for the user A's brother is greater than the first score, the user device A 202a takes no further action, e.g., and does not perform an action in response to the particular utterance.

Some of the imposter speaker models 210a may be used during particular times of the day, particular days, at particular locations, or a combination of two or more of these. For instance, when the user device A 202a is at the house of a family member of the user A, the user device A 202a may use imposter speaker models for the people who live in the family member's house, e.g., and not use those imposter speaker models otherwise unless a co-located user device for one of those people is detected.

In some examples, the user devices A-B 202a-b may use settings 214a-b stored in memory to determine whether the respective speaker model, or a score generated using the respective speaker model, may be provided to other user devices, e.g., using a wireless communication channel 216 such as one created using near field communications. For instance, the user device A 202a may receive the particular utterance, determine that the user device B 202b is in a physical area near the user device A 202a, and request a speaker model from the user device B 202b, e.g., the speaker model B 206b without knowing the particular speaker model that is being requested. The user device B 202b receives the request, analyzes the settings B 214b to determine whether the speaker model B 206b may be shared with another device or with the specific user device A 202a, and, in response to determining that the user device B 202b may share the speaker model B 206b, the user device B 202b sends a copy of the speaker model B 206b to the user device A 202a using the wireless communication channel 216.

The user device A 202a may request a speaker model for a user B of the user device B 202b or for all users of the user device B 202b, e.g., in examples when more than one person may operate a single user device. The speaker model A 206a may include multiple speaker models, in examples when more than one person operates the user device A 202a. In these examples, the speaker verification module 208a may generate a score for each of the users of the user device A 202a, compare these scores with other scores generated using the imposter speaker models 210a, and determine a highest score. When the highest score is for one of the users of the user device A 202a, the user device A 202a may perform an appropriate action, e.g., determined at least in part using the speech recognition module 212a.

A determination of whether to perform the action or not may be made using the particular type of action, the specific user of the user device A 202a, or both. For instance, a first user A may have permissions to launch any application on the user device A 202a while a second user A may have permissions to launch only educational applications on the user device A 202a.

In some implementations, one or more of the speaker models are stored on the server 204 instead of, or in addition to, the user devices A 202a-b. For example, the server 204 may store speaker models 218 for the users A-B of the user devices A-B 202a-b. In these examples, the user device A 202a or the user device B 202b may receive an audio signal encoding an utterance and provide the audio signal, or a portion of the audio signal, e.g., a representation of a portion of the audio signal, to the server 204. The server 204 receives an identifier of the user device, the speaker model, or the user of the user device and determines which one of the speaker models 218 corresponds with the received identifier, e.g., using speaker identifiers 220.

In some examples, the server 204 receives identifiers for other speaker models that will be used in addition to the speaker model of the user device when analyzing the portion of the audio signal. For instance, when the user device A 202a determines that the user device B 202b is physically located in an area near the physical location of the user device A 202a, the server 204 may receive the audio signal and identifiers for the user devices A-B 202a-b from the user device A 202a with a speaker verification request.

The server 204 may receive location information from the user device, e.g., with the audio signal or separately, and use the location information to determine other user devices that are physically located in an area near the physical location of the user device that provided the audio signal to the server 204, e.g., using location information for the other user devices. The server 204 may then identify other speaker models 218 for the determined other devices. The server 204 may use the identified other speaker models when generating the scores on the server 204 or when providing speaker models to the user devices A-B 202a-b.

A speaker verification module 222 on the server 204 uses all of the speaker models, from the user device that provided the server 204 with the audio signal and the determined other user devices, to generate respective scores that each represent a likelihood that the respective person spoke a particular utterance encoded in the audio signal. The speaker verification module 222 may retrieve the speaker models from a memory included in the server 204. The speaker verification module 222 may receive the speaker models from the respective user devices. The server 204, or the speaker verification module 222, determines a highest score and provides a respective user device with a message indicating that the user of that user device is most likely to have spoken the particular utterance. The server 204 may provide the other user devices with messages indicating that the corresponding other users likely did not speak the utterance.

In some examples, a particular user device may provide the server 204 with multiple speaker identifiers, e.g., one for each of the users of the particular user device, one for each of the imposter speaker models that are associated with the particular user device, or both. The particular user device may include data that indicates the type of model for each of the speaker identifiers, e.g., user or imposter. The speaker verification module 222 may analyze an audio signal using all of the speaker models 218 that correspond with the received speaker identifiers and determine which speaker model is used to generate a highest score. When the highest score was generated using a model for one of the users of the particular user device, the server 204 provides the particular user device with a message indicating that a user of the particular device is most likely to have spoken the particular utterance. The message may include the speaker identifier for the particular speaker model used to generate the highest score.

In some implementations, a lower numerical value may represent a greater likelihood that a particular user spoke an utterance compared to a higher numerical value. For instance, a lower numerical value may be a higher score than a higher numerical value.

In some examples, when a user device has multiple users, the user device, or the server 204, may determine a particular speaker model for the current user of the user device. For instance, the user device may provide a speaker identifier for the current user to the server 204 and indicate that all of the other speaker identifiers, for other users of the user device, are for imposter speaker models stored on the server 204. In some examples, the user device uses the speaker model for the current user to determine whether or not to perform an action in response to receipt of an audio signal and uses the speaker models for the other users of the user device as imposter speaker models. The user device may use any appropriate method to determine the current user of the user device, such as the use of a password, a username, or both, to unlock the user device and to determine the current user.

In some implementations, when a score is generated using an imposter speaker model, or a model received from another user device, for an audio signal and that score is greater than or equal to the score generated using a speaker model for a user of a particular user device, that particular user device performs no action in response to receipt of the audio signal. In these implementations, when two scores are the same, no user device performs an action in response to receipt of the audio signal. In other implementations, when two scores are the same, for two users of different user devices, and both are the highest score, the two user devices, which correspond to the two scores, may both perform an action. In implementations when two scores for models on a single user device are the same highest score, the user device may or may not perform an action. For instance, when each of the two scores is for a different user of the user device, the user device may perform an action. When one of the scores is for a user speaker model and one of the scores is for an imposter speaker model, the user device may perform no action.

In some implementations, a user device may adjust a threshold value depending on a quantity of detected other user devices. For instance, the threshold value may be less restrictive when no other devices are detected and more restrictive when other user devices are detected, e.g., after receiving an audio signal. The threshold value may become more restrictive based on a quantity of other devices detected, e.g., linearly or exponentially, until a maximum threshold value is reached. In some examples, one or more scores may be normalized, e.g., using a combination of scores for the same utterance generated using different similarity models. The combination may be an average, a sum, or a product.

In some implementations, one or more of the user devices A-B 202a-b may detect other user devices in a physical area near the respective user device periodically. For example, the user device B 202b may determine, every five, ten, or thirty minutes, whether another user device is in the same room as the user device B 202b. In some examples, the user device B 202b may determine whether another user device is within a predetermined distance from the user device B 202b upon determining that the user device B 202b has remained in substantially the same area for a predetermined period of time, e.g., that the user B of the user device B 202b is holding the user device B 202b but is not walking or the user B is remaining in a single room.

The user devices A-B 202a-b may include personal computers, mobile communication devices, e.g., smartphones or tablets, and other devices that can send and receive data over a network 224, e.g., wearable devices such as watches or thermostats, televisions, and network connected appliances. The network 224, such as a local area network (LAN), wide area network (WAN), the Internet, or a combination thereof, connects the user devices A-B 202a-b and the server 204.

Figure 3:
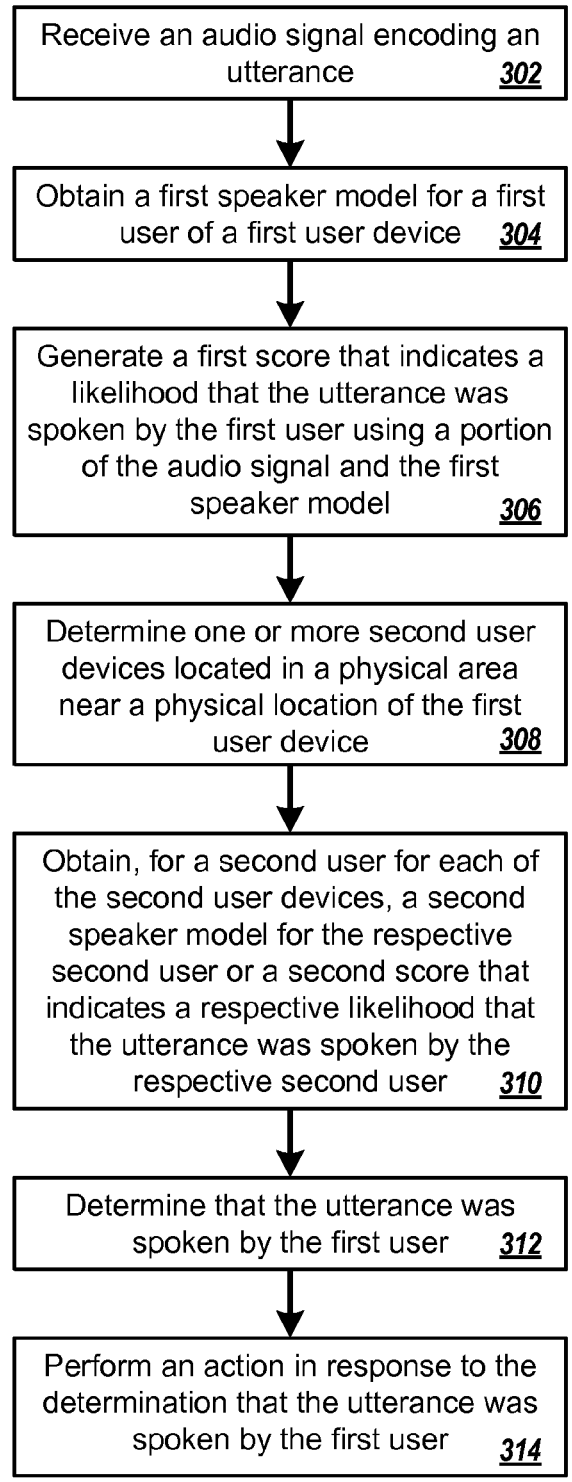
FIG. 3 is a flow diagram of a process for determining whether an utterance was spoken by a user.

FIG. 3 is a flow diagram of a process 300 for determining whether an utterance was spoken by a user. For example, the process 300 can be used by the user device A 202a or the server 204 from the speaker verification system 200.

The process receives an audio signal encoding an utterance (302). For instance, a microphone on a user device receives the audio signal and provides the audio signal to a speaker verification module on a first user device or to a server.

The process obtains a first speaker model for a first user of a first user device (304). For example, the speaker verification module determines that there is a single, first user for the first user device and obtains the first speaker model for that first user. In some examples, the speaker verification module determines a current user for the first user device, who is currently logged in to the first user device or who most recently logged in to the first user device when the first user device is in a locked state, and obtains the first speaker model for that user.

In some examples, the speaker verification module determines that there are multiple users for the first user device and obtains the first speaker model for one of those users. The first user device may then repeat one or more steps in the process 300 for the other users. For instance, the speaker verification module may repeat steps 304 and 306 for each of the users.

The process generates a first score that indicates a likelihood that the utterance was spoken by the first user using a portion of the audio signal and the first speaker model (306). For example, the speaker verification module of the first device uses the entire audio signal and the first speaker model to generate the first score.

The audio signal may include a transformation of the utterance that the speaker verification module can compare against the first speaker model. For instance, the microphone may record the utterance and provide the recording of the utterance to a feature extraction module that generates the audio signal which the speaker verification module uses to generate the first score.

In implementations when there are multiple users of the first user device, the speaker verification module compares the scores for each of the multiple users and selects the greatest score. For example, the first user device may have between one and five speaker models, each for a respective user of the first user device.

The speaker verification module may compare a score, e.g. the greatest score, with a threshold score value to determine whether the score satisfies the threshold score value. For instance, the speaker verification module determines whether the greatest score is higher than the threshold score value when the threshold score value is a minimum required score or whether the greatest score is lower than the threshold score value when the threshold score value is a maximum required score, e.g., and the greatest score has the lowest numerical value of the scores generated for the users of the first user device.

If the greatest score satisfies the threshold score value, the speaker verification module, or another module on the first user device, may generate scores for each of the imposter speaker models identified on the first user device, e.g., stored on the first user device or on a server, and continues with the process 300 to perform step 308. If the greatest score does not satisfy the threshold score value, the user device, or the server, may stop performing the process 300. When the first user device or the server stop performing the process 300, the first user device or the server may stop requesting other speaker models, or other scores, from other user devices.

The speaker verification module on the first user device, or a similar module on the server, may generate a score for each of the imposter speaker models until a score that is the same as or greater than the greatest score for a user of the first user device is generated, at which time the speaker verification module stops performing the process 300. When the speaker verification module determines that there are no more imposter speaker models, or that the greatest score for a user of the first user device has been compared with scores for all of the imposter speaker models, including scores for imposter speaker models for other users of other user devices, e.g., determined using steps 308 and 310, the process proceeds with step 312.

For example, the process determines one or more second user devices located in a physical area near a physical location of the first user device (308). The first user device may determine the second user devices using near field communications. In examples when the speaker verification module has already determined the first score, the first user device may provide the first score to the other user devices, e.g., for use by other speaker verification modules performing a similar process. In some examples, the first user device may provide the first speaker model, other speaker models for other users of the first user device, or a combination of the two, to at least some of the second user devices.

In some implementations, the process may determine second user devices that are co-located with the first user device but in different physical locations. For instance, the first user device may determine that a particular second user device is co-located with the first user device when both devices participate in, or are near devices participating in, the same telephone or video conference. The devices may be located in the same physical room, or in different rooms, that each include with separate video conference equipment. The first device, or a server, may determine that the devices are co-located using calendar entries for the respective users, e.g., when the calendar entry for both users is the same and indicates all of the users attending the event.

The process obtains, for a second user for each of the second user devices, a second speaker model for the respective second user or a second score that indicates a respective likelihood that the utterance was spoken by the respective second user (310). For instance, other speaker verification modules on the second user devices generate respective second scores for each of the users of the second user devices, e.g., using respective second speaker models and other audio signals encoding the same or a portion of the same utterance. The first user device receives each of the second scores from the second user devices, and may receive multiple second scores from a single second user device, in a single message or in multiple messages, when that single second user device has multiple users.

In some examples, a server may generate some of the second scores and provide those second scores to the first user device. The server may generate the first score or first scores for the users of the first user device and provide the first scores to the first user device. The server may compare all of the scores and send a message to a device with the greatest score. The server may or may not send messages to other devices that do not correspond with the greatest score.

The process determines that the utterance was spoken by the first user (312). For example, the speaker verification module compares the greatest score for the first user device with the scores for the imposter speaker models stored on the user device, the second scores received from the second user devices, or both. The speaker verification module may stop comparing the greatest score for the first user device with other scores when the speaker verification module determines that one of the other scores is greater than or equal to the greatest score for the first user device, e.g., and stop performing the process 300.

The process performs an action in response to the determination that the utterance was spoken by the first user (314). For instance, a speech recognition module analyzes the audio signal and determines a text representation of the utterance encoded in the audio signal. The first user device uses the text representation to determine a command provided by the first user in the utterance and performs the action in response to the command.

The order of steps in the process 300 described above is illustrative only, and determining whether the utterance was spoken by the user can be performed in different orders. For example, the user device may determine the second user devices located in a physical area near the physical location of the user device, e.g., perform step 308, prior to receiving the audio signal, e.g., performing step 302.

In some implementations, the process 300 can include additional steps, fewer steps, or some of the steps can be divided into multiple steps. For example, the first user device may determine the second user devices, determine whether any speaker models for a second user is stored in memory, e.g., as an imposter speaker model, and only request the second speaker models that are not stored in the memory from the respective second user devices. In these examples, the first user device may remove any imposter speaker models from memory for other users whose respective other user devices are no longer in the physical area near the physical location of the first user device, e.g., and currently are not included in the second user devices.

When removing the imposter speaker models from memory for user devices that are no longer in the physical area near the physical location of the first user device, the first user device may retain any imposter speaker models for other users that are flagged as not for removal. For instance, one of the imposter speaker models may be for a friend of the first user who is often in a physical area near a physical location of the first user device. The first user device may retain the one of the imposter speaker models for the friend even when the first user device does not detect another user device that is operated by the friend.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Figure 4:
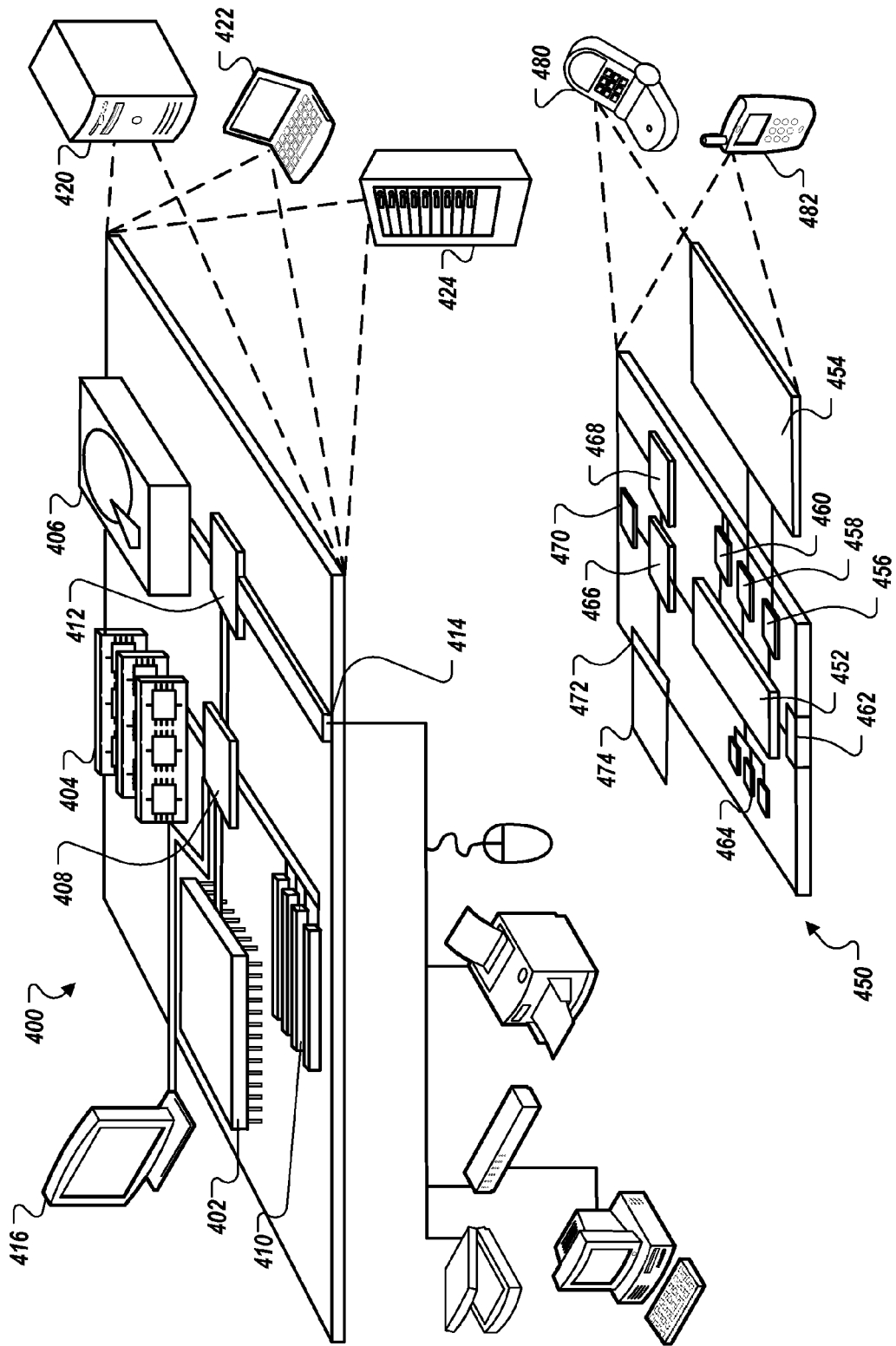
FIG. 4 is a block diagram of computing devices that may be used to implement the systems and methods described in this document.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, smart-watches, head-worn devices, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of duties is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication (e.g., via a docking procedure) or for wireless communication (e.g., via Bluetooth or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to device 450 through expansion interface 472, which may include, for example, a SIMM card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS receiver module 470 may provide additional wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

In situations in which the systems discussed here collect personal information about users, or may make use of personal information, the users may be provided with an opportunity to control whether programs or features collect user information, e.g., a speaker model, a user's preferences, or a user's current location, or to control whether and/or how to receive content from the content server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained, such as to a city, ZIP code, or state level, so that a particular location of a user cannot be determined. Thus, the user may have control over how information is collected about the user and used by a content server.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous. For instance, a module that performs similarity score computation, e.g., part of a speaker verification module, may be implemented in hardware, such as directly on a digital signal processing (DSP) unit.

What is claimed is:

1. A computer-implemented method comprising:
  obtaining, by a first user device, a first score that indicates a likelihood that an utterance encoded in an audio signal that is generated by the first user device was spoken by a first user of the first user device;
  obtaining, by the first user device from another device that is a different device than the first user device and for a second user device that is co-located with the first user device, a second score that indicates a likelihood that the utterance was spoken by a second user that is associated with the second user device;
  determining, by the first user device, that the utterance was likely spoken by the first user based at least on (i) the first score that indicates a likelihood that the utterance was spoken by the first user of the first user device, and (ii) the second score that indicates a likelihood that the utterance was spoken by the second user that is associated with the second user device; and
  performing an action that corresponds with a spoken command encoded in the audio signal in response to determining that the utterance was likely spoken by the first user.

2. The method of claim 1 comprising determining, by the first user device, that the second user device is co-located with the first user device.

3. The method of claim 2 wherein determining, by the first user device, that the second user device is co-located with the first user device comprises determining, by the first user device, that the second user device is co-located in a physical area near a physical location of the first user device.

4. The method of claim 2 comprising:
  determining, by the first user device, whether the first user device has one or more settings that allow the first user device access to the second score that indicates a likelihood that the utterance was spoken by the second user that is associated with the second user device in response to determining that the second user device is co-located with the first user device,
  wherein obtaining, by the first user device, the second score that indicates a likelihood that the utterance was spoken by the second user that is associated with the second user device comprises obtaining, by the first user device, the second score that indicates a likelihood that the utterance was spoken by the second user that is associated with the second user device in response to determining that the first user device has one or more settings that allow the first user device access to the second score.

5. The method of claim 1 comprising:
generating, by the first user device, the first score that indicates a likelihood that the utterance was spoken by the first user using a portion of the audio signal and a first speaker model that is specific to the first user.

6. The method of claim 1 comprising:
comparing the first score with the second score to determine a highest score, wherein determining that the utterance was likely spoken by the first user comprises determining that the first score is the highest score.

7. The method of claim 1 wherein receiving, by the first user device from another device that is a different device than the first user device and for the second user device that is co-located with the first user device, the second score that indicates a likelihood that the utterance was spoken by the second user that is associated with the second device comprises receiving the second score from a server.

8. The method of claim 1 wherein receiving, by the first user device from another device that is a different device than the first user device and for the second user device that is co-located with the first user device, the second score that indicates a likelihood that the utterance was spoken by the second user that is associated with the second device comprises receiving the second score from the second user device.

9. The method of claim 1 comprising:
determining, by the first user device, one or more third speaker models, associated with the first user device, for other people who may be located in a physical area near a physical location of the first user device; and
determining, by the first user device, that the utterance was likely spoken by the first user based at least on (i) the first score that indicates a likelihood that the utterance was spoken by the first user of the first user device, (ii) the second score that indicates a likelihood that the utterance was spoken by the second user that is associated with the second user device, and (iii) the third speaker models for other people who may be located in a physical area near a physical location of the first user device.

10. The method of claim 9 comprising:
generating, by the first user device for each of the third speaker models, a respective third score using the respective third speaker model and a portion of the audio signal; and
comparing, by the first user device, the first score, the second score, and the third scores to determine a highest score.

11. The method of claim 9 comprising:
receiving, by the first user device for each of the third speaker models, a respective third score from a server; and
comparing, by the first user device, the first score, the second score, and the third scores to determine a highest score.

12. The method of claim 9 comprising:
determining, by the first user device for a third user device, a frequency with which the third user device is located in a physical area near a physical location of the first user device;
determining, by the first user device, whether the frequency satisfies a threshold frequency; and
associating, by the first user device, a third speaker model specific to a third user of the third user device with the first user device in response to determining that the frequency satisfies the threshold frequency.

13. The method of claim 12 wherein associating, by the first user device, the third speaker model specific to the third user of the third user device with the first user device comprises storing the third speaker model in a memory of the first user device.

14. The method of claim 12 wherein associating, by the first user device, the third speaker model specific to the third user of the third user device with the first user device comprises sending, by the first user device to a server, a message indicating that the third speaker model should be associated with the first user device.

15. A computer-implemented method comprising:
receiving, by a first user device, an audio signal that is generated by the first user device and that encodes an utterance;
obtaining, by the first user device, a first score that indicates a respective likelihood that the utterance was spoken by a first user of the first user device;
determining, by the first user device for a second user of a corresponding second user device, that the second user device is co-located with the first user device;
identifying, by the first user device, one or more third speaker models associated with the first user device; and
determining, by the first user device, that a subset of the third speaker models comprises a second speaker model for the second user in response to (i) determining that the second user device is co-located with the first user device and (ii) receiving the audio signal that is generated by the first user device and that encodes the utterance;
determining, by the first user device, that the utterance was spoken by the first user using the first score and the second speaker model; and
performing an action that corresponds with a spoken command encoded in the audio signal in response to determining that the utterance was spoken by the first user.

16. The method of claim 15 comprising:
removing, by the first user device, the association between the third speaker models not included in the subset of the third speaker models and the first user device.

17. The method of claim 15 comprising:
receiving the second speaker model for the second user from a server in response to determining that the subset of the third speaker models comprises the second speaker model for the second user.

18. The method of claim 15 comprising:
receiving a second score that indicates a respective likelihood that the utterance was spoken by the second user from a server in response to determining that the subset of the third speaker models comprises the second speaker model for the second user, wherein determining that the utterance was spoken by the first user using the first score and the second speaker model comprises determining that the utterance was spoken by the first user using the first score and the second score.

19. A system comprising:
one or more computers and one or more storage devices storing instructions that are operable, when executed by the one or more computers, to cause the one or more computers to perform operations comprising:
obtaining, by a first user device, a first score that indicates a likelihood that an utterance encoded in an audio signal that is generated by the first user device was spoken by a first user of the first user device;
obtaining, by the first user device from another device that is a different device than the first user device and for a second user device that is co-located with the first user device, a second score that indicates a respective likelihood that the utterance was spoken by a second user that is associated with the second user device;

determining, by the first user device, that the utterance was likely spoken by the first user based at least on (i) the first score that indicates a likelihood that the utterance was spoken by the first user of the first user device, and (ii) the second score that indicates a likelihood that the utterance was spoken by the second user that is associated with the second user device; and performing an action that corresponds with a spoken command encoded in the audio signal in response to determining that the utterance was likely spoken by the first user.

20. A non-transitory computer-readable medium storing software comprising instructions executable by one or more computers which, upon such execution, cause the one or more computers to perform operations comprising:

obtaining, by a first user device, a first score that indicates a likelihood that an utterance encoded in an audio signal that is generated by the first user device was spoken by a first user of the first user device;

obtaining, by the first user device from another device that is a different device than the first user device and for a second user device that is co-located with the first user device, a second score that indicates a likelihood that the utterance was spoken by a second user that is associated with the second user device;

determining, by the first user device, that the utterance was likely spoken by the first user based at least on (i) the first score that indicates a likelihood that the utterance was spoken by the first user of the first user device, and (ii) the second score that indicates a likelihood that the utterance was spoken by the second user that is associated with the second user device; and performing an action that corresponds with a spoken command encoded in the audio signal in response to determining that the utterance was likely spoken by the first user.

* * * * *